United States Patent
Yoshikawa

(10) Patent No.: US 10,246,625 B2
(45) Date of Patent: *Apr. 2, 2019

(54) DISPERSION SOLUTION FOR DRILLING AND METHOD OF EXTRACTION USING THE DISPERSION SOLUTION

(71) Applicant: TOYO SEIKAN GROUP HOLDINGS, LTD., Tokyo (JP)

(72) Inventor: Seishi Yoshikawa, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/208,164

(22) Filed: Jul. 12, 2016

(65) Prior Publication Data

US 2016/0319177 A1 Nov. 3, 2016

Related U.S. Application Data

(62) Division of application No. 14/649,971, filed as application No. PCT/JP2013/082663 on Dec. 5, 2013, now abandoned.

(30) Foreign Application Priority Data

Dec. 12, 2012 (JP) ................................. 2012-271084
Aug. 1, 2013 (JP) ................................. 2013-160064

(51) Int. Cl.
| | |
|---|---|
| C09K 8/035 | (2006.01) |
| C09K 8/12 | (2006.01) |
| E21B 43/26 | (2006.01) |
| E21B 43/267 | (2006.01) |
| C09K 8/68 | (2006.01) |
| C09K 8/88 | (2006.01) |
| E21B 21/00 | (2006.01) |

(52) U.S. Cl.
CPC ............. *C09K 8/12* (2013.01); *C09K 8/035* (2013.01); *C09K 8/68* (2013.01); *C09K 8/885* (2013.01); *E21B 21/003* (2013.01); *E21B 43/26* (2013.01); *E21B 43/267* (2013.01); C09K 2208/26 (2013.01)

(58) Field of Classification Search
CPC . C09K 8/12; C09K 8/035; C09K 8/68; C09K 8/885; C09K 2208/26; E21B 43/26; E21B 21/003; E21B 43/267
See application file for complete search history.

(56) References Cited

U.S. PATENT DOCUMENTS

| | | | |
|---|---|---|---|
| 4,919,725 A | 4/1990 | Jones | |
| 5,688,586 A | 11/1997 | Shiiki et al. | |
| 6,235,825 B1 | 5/2001 | Yoshida et al. | |
| 6,372,844 B1 | 4/2002 | Shinoda et al. | |
| 6,949,491 B2 | 9/2005 | Cooke | |
| 7,267,170 B2 | 9/2007 | Mang et al. | |
| 7,268,100 B2 | 9/2007 | Kippie et al. | |
| 7,398,826 B2 | 7/2008 | Hoefer et al. | |
| 7,566,686 B2 | 7/2009 | Kippie et al. | |
| 7,833,950 B2 | 11/2010 | Willberg et al. | |
| 7,868,069 B2 | 1/2011 | Ito | |
| 8,016,040 B2 | 9/2011 | Ali et al. | |
| 8,048,502 B2 | 11/2011 | Yoshikawa et al. | |
| 8,501,445 B2 | 8/2013 | Yoshikawa et al. | |
| 8,846,355 B2 | 9/2014 | Yoshikawa et al. | |
| 9,040,468 B2 | 5/2015 | Loiseau et al. | |
| 2005/0239925 A1* | 10/2005 | Ito ............................. | C08J 9/26 524/27 |
| 2006/0116296 A1 | 6/2006 | Kippie et al. | |
| 2006/0157248 A1 | 7/2006 | Hoefer et al. | |
| 2007/0204997 A1* | 9/2007 | Harris ....................... | C09K 8/03 166/311 |
| 2008/0039345 A1 | 2/2008 | Kippie et al. | |
| 2009/0170981 A1 | 7/2009 | Ito | |
| 2010/0086718 A1 | 4/2010 | Yoshikawa et al. | |
| 2010/0126723 A1 | 5/2010 | Ali et al. | |
| 2011/0028629 A1 | 2/2011 | Yamamura et al. | |
| 2011/0201069 A1* | 8/2011 | Yoshikawa ............. | C08J 11/105 435/145 |
| 2012/0132421 A1* | 5/2012 | Loiseau ................... | C09K 8/82 166/279 |
| 2013/0065765 A1 | 3/2013 | Selifonov et al. | |
| 2013/0184415 A1 | 7/2013 | Yoshikawa et al. | |
| 2013/0252854 A1 | 9/2013 | Abe et al. | |

(Continued)

FOREIGN PATENT DOCUMENTS

| | | |
|---|---|---|
| EP | 2 348 122 | 7/2011 |
| WO | 2009/100908 | 8/2009 |

(Continued)

OTHER PUBLICATIONS

U.S. Appl. No. 14/649,947 to Seishi Yoshikawa et al., filed Jun. 5, 2015.
Search Report issued in Patent Application No. PCT/JP2013/082663, dated Mar. 4, 2014.
Extended European Search Report issued in Patent Application No. 13862821.9, dated Jul. 16, 2016.

*Primary Examiner* — Zakiya W Bates
*Assistant Examiner* — Crystal J Miller
(74) *Attorney, Agent, or Firm* — Greenblum & Bernstein, P.L.C.

(57) ABSTRACT

A method of extracting underground natural resources through an ore chute located in a temperature region where temperature in the ground is not higher than 60° C., comprising introducing a dispersion solution obtained by dispersing polyoxaylate in water into the ore chute with pressure to hydrolyze the polyoxalate.

3 Claims, No Drawings

(56) References Cited

U.S. PATENT DOCUMENTS

| | | | |
|---|---|---|---|
| 2013/0274373 A1* | 10/2013 | Yoshikawa | C08G 63/08 |
| | | | 523/124 |
| 2013/0288322 A1 | 10/2013 | Yoshikawa et al. | |
| 2013/0303412 A1 | 11/2013 | Luyster et al. | |
| 2014/0323365 A1 | 10/2014 | Kamann et al. | |
| 2014/0326452 A1 | 11/2014 | Loiseau et al. | |
| 2015/0010974 A1 | 1/2015 | Yoshikawa et al. | |
| 2015/0087560 A1 | 3/2015 | Abe et al. | |
| 2015/0126414 A1 | 5/2015 | Abe et al. | |
| 2016/0229979 A1* | 8/2016 | Katayama | B09B 3/00 |

FOREIGN PATENT DOCUMENTS

| | | |
|---|---|---|
| WO | 2010/055903 | 5/2010 |
| WO | 2012/050187 | 4/2012 |
| WO | 2012/121294 | 9/2012 |
| WO | 2013/161754 | 10/2013 |
| WO | 2013/161755 | 10/2013 |

* cited by examiner

DISPERSION SOLUTION FOR DRILLING AND METHOD OF EXTRACTION USING THE DISPERSION SOLUTION

CROSS-REFERENCE TO RELATED APPLICATION

This application is a divisional application of U.S. application Ser. No. 14/649,971, filed on Jun. 5, 2015, which is a National Phase of PCT Patent Application No. PCT/JP2013/082663, filed on Dec. 5, 2013, which claims the benefit of Japanese Application No. 2013-160064, filed on Aug. 1, 2013 and Japanese Application No. 2012-271084, filed on Dec. 12, 2012. The entire disclosures of each of the foregoing applications are incorporated by reference herein in their entireties.

TECHNICAL FIELD

This invention relates to a dispersion solution for drilling used for extracting underground resources such as petroleum, natural gases and the like relying on a well drilling method such as rotary drilling method or riserless drilling method, and relates to a method of extracting underground resources using the dispersion solution.

BACKGROUND ART

Well drilling methods such as rotary drilling method and riserless drilling method as well as hydraulic fracturing method have now been widely employed for extracting underground resources.

The rotary drilling method consists of forming the well by drilling while refluxing the mud and forming a filter cake called mud wall on the wall surfaces of the well using a finishing fluid blended with a water loss-preventing agent. The cake maintains the chute walls stable, prevents the chute walls from collapsing and reduces friction to the fluid flowing through the well.

The hydraulic fracturing method consists of pressurizing the fluid filled in the well to form cracks (fractures) in the vicinities of the well to thereby improve permeability in the vicinities of the well (for easy flow of the fluid) in an attempt to increase the effective sectional area through which the resources such as oils and gases flow into the well and, therefore, in order to improve productivity of the well.

Here, as the water loss-preventing agent that is added to the finishing fluid, there are chiefly used calcium carbonate or various kinds of salts in a granular form. However, use of the water loss-preventing agent brings about such problems that it becomes necessary to conduct a treatment with acid to remove it, or the grains enter into the stratum and, specifically, into cracks in the stratum to block the flow of gases. That is, the water loss-preventing agent stays clogged in the stratum from where the resources are to be extracted hindering the production.

Further, the fluids used in the hydraulic fracturing method can be grouped into a fracturing fluid and a filler, the fracturing fluid being used so as to permeate into the vicinities of the well under the application of a high pressure while the filler being used in order to block the flow passage in the well. As the fluid for use in the hydraulic fracturing method, there has heretofore been used a viscous fluid like jelly gasoline. In recent years, however, as the shale gas or the like gas has now been extracted from the shale layer that exists in relatively shallow places and by taking the effects on the environment into consideration, it is becoming a common practice to use an aqueous dispersion solution obtained by dissolving or dispersing a polymer in water. A known example of the polymer is polylactic acid (see a patent document 1).

That is, the polylactic acid is a substance that exhibits hydrolysable capability and biodegradable capability, and, even if it remains under the ground, is decomposed by water or enzyme in the ground and does not adversely affect the environment. Further, the water that is used as a dispersant, too, can be considered to be far from affecting the environment as compared to gasoline or the like.

The well is filled with the aqueous dispersion solution in which the polylactic acid has been dispersed as the fracturing fluid and is pressurized so that the polylactic acid permeates to the vicinities of the well. Here, the polylactic acid undergoes the hydrolysis and loses the form of the resin. Therefore, spaces (or cracks) form in the portions through where the polylactic acid had been permeated accounting for an increase in the space of the well into which the resources can flow.

Further, the polylactic acid also works as a water loss-preventing agent. That is, by forming the filter cake in the well by using the finishing fluid that is blended with the polylactic acid as the water loss-preventing agent, it is made possible to suppress the water contained as a dispersion medium in various fluids used in the subsequent steps of extraction from permeating into the ground too much. Therefore, the polylactic acid offers an advantage of minimizing a change in the environment in the stratum. Besides, no treatment with acid is necessary since it decomposes in the ground.

In addition, the lactic acid which is decomposed from the polylactic acid is an organic acid. As the polylactic acid decomposes, the lactic acid is released. The lactic acid corrodes the shale layer and accelerates the shale layer to become porous.

However, though the polylactic acid undergoes the hydrolysis relatively quickly at temperatures of not lower than 100° C., its rate of hydrolysis is small at temperatures of lower than 100° C. If used for extracting, for example, the shale gas from under the ground where the temperature is low, therefore, the efficiency of extraction becomes poor and improvements are desired.

On the other hand, a proposal has been made to use a polyglycolic acid in place of the polylactic acid (see a patent document 2).

The polyglycolic acid, too, has been known to be useful as a biodegradable resin. Besides, its hydrolysable capability is higher than that of the polylactic acid; i.e., the rate of its hydrolysis at a temperature of, for example, about 80° C. is considerably larger than that of the polylactic acid and it can be effectively used to substitute for the polylactic acid. At temperatures of not higher than, specifically, 80° C. and, more specifically, not higher than 60° C., however, the rate of hydrolysis of the polyglycolic acid becomes very small. Besides the polyglycolic acid is considerably expensive as compared to the polylactic acid.

PRIOR ART DOCUMENTS

Patent Documents

Patent document 1: U.S. Pat. No. 7,833,950
Patent document 2: WO2012-050187

OUTLINE OF THE INVENTION

Problems that the Invention is to Solve

It is, therefore, an object of the present invention to provide a dispersion solution for drilling which exhibits a highly hydrolysable capability at temperatures of as low as 80° C. or lower and, further, as low as 60° C. or lower, which is obtained by dispersing an inexpensive hydrolysable resin material in an aqueous medium, and is used as a finishing fluid for the well drilling method or is used as a fracturing fluid or as a filler for extracting underground resources by the hydraulic fracturing method.

Another object of the present invention is to provide a method of extraction by using the above dispersion solution for drilling.

Means for Solving the Problems

According to the present invention, there is provided a dispersion solution for drilling obtained by dispersing, in an aqueous medium, a polyoxalate as the hydrolysable resin material.

According to the present invention, further, there is provided a method of extracting underground natural resources through a well formed by drilling, comprising the step of introducing the dispersion solution described in claim 1 into under the ground with pressure to hydrolyze the hydrolysable resin material in hot water of not lower than 40° C.

In the extraction method of the present invention, it is desired that:
(1) The dispersion solution for drilling is introduced with pressure into the well to generate cracks in the vicinities of the well;
(2) The well is filled with the hydrolysable resin material and
(3) The dispersion solution for drilling is blended with a gelling agent, a gel is formed in the well with an acid released by the hydrolysis of the hydrolysable resin material and, thereafter, the gel is decomposed.

Effects of the Invention

In the dispersion solution for drilling of the present invention, the polyoxalate (specifically, polyethylene oxalate) used as the hydrolysable resin material being dispersed in the aqueous medium is considerably inexpensive as compared to the polyglycolic acid and, besides, is very highly hydrolysable and shows a very highly hydrolysable capability even in a low temperature range of not higher than 60° C. (e.g., at a temperature of around 50° C.) as demonstrated in Examples appearing later.

Besides, as will be understood from the above description, the dispersion solution for drilling of the present invention can be effectively used as a fracturing fluid, as a filler or as a water loss-preventing agent in the finishing fluid that is used for extracting shale gases that are, in many cases, produced from the regions close to the ground surface where the temperature is about 50° C. In such low-temperature ranges, in particular, microorganisms are not losing their activities and the polyoxalate is allowed to exhibit its biodegradable function to a sufficient degree, which is a great advantage of the present invention.

The dispersion solution for drilling can be used, for example, as the fracturing fluid. If the well is filled with the dispersion solution and is pressurized, the hydrolysable resin material permeates to the vicinities of the well. Even if the temperature in the ground is low, the hydrolysable resin material undergoes the hydrolysis in short periods of time. Therefore, spaces (cracks) of a pillar structure can be formed in the portions to where the resin material has permeated making it possible to improve the drilling efficiency for extracting, for example, the shale gas.

Further, the hydrolysable resin material in the dispersion solution also works as a filler to block the flow passage in the well and fills in the well, but subsequently undergoes the hydrolysis, alleviating the problem of clogging caused by the sedimentation of the filler and, therefore, enabling the production efficiency to be improved.

Further, upon blending the dispersion solution with a gelling agent such as chitosan that dissolves under the condition of a low pH, the acid formed by the hydrolysis of the hydrolysable resin material accelerates the gelation in the well causing the fluid to become highly viscous. This enables the solution to effectively permeate into the vicinities of the well as the fluid is introduced therein with pressure. At the same time, the gel is decomposed (viscosity decreases) with the acid formed by the continuing hydrolysis and, therefore, the fracturing fluid is effectively recovered.

On the other hand, if the dispersion solution for drilling of the present invention is used as the finishing fluid, the filter cake which consists of solid components (water loss-preventing agent) such as calcium carbonate and the like formed on the wall surfaces of the well can be decomposed with the acid formed by the hydrolysis of the hydrolysable resin material eliminating the need of subsequently conducting the treatment with acid and, therefore, making it possible to quickly recover the water loss-preventing agent. Besides, the hydrolysable resin material (solid component) in the dispersion solution by itself works as the water loss-preventing agent. Namely, the filter cake consisting of the solid component prevents the loss of water from the well (prevents the water from permeating into the ground). After the passage of a predetermined period of time, the cake undergoes the hydrolysis eliminating, as a matter of course, the need of any special treatment with acid, and can, thereafter, be recovered.

Modes for Carrying Out the Invention

The dispersion solution for drilling of the present invention is a dispersion solution obtained by dispersing the hydrolysable resin material in the aqueous medium and can, as required, be blended with known additives that are used for drilling or hydraulically fracturing the wells.

<Hydrolysable Resin Materials>

The present invention uses a polyoxalate as the hydrolysable resin material. The resin material polymerized with the oxalic acid as at least one monomer is referred to as the polyoxalate.

The polyoxalate is a polyester derived from the oxalic acid and a polyhydric alcohol, and is, usually, obtained by an ester interchange polymerization of a dialkyl oxalate with the polyhydric alcohol.

The acid released from the polyoxalate has a pH (25° C.) of not more than 3 in an aqueous dispersion solution thereof of a concentration of 0.005 g/ml. If mixed into the water, the polyoxalate undergoes the hydrolysis to release oxalic acid.

The oxalic acid serves as a hydrolyzing catalyst to further accelerate the hydrolysis. As compared to the polylactic acid and the polyglycolic acid, therefore, the polyoxalate exhibits a very high hydrolyzing capability and undergoes the hydrolysis to a very high degree even in a low-temperature range of not higher than 80° C. and, further, not higher than 60° C. as demonstrated in Examples appearing later.

Concerning the polyoxalate, examples of the polyhydric alcohol to be reacted with the oxalic acid include ethylene glycol, propylene glycol, butanediol, hexanediol, octanediol, dodecanediol, neopentyl glycol, glycerin, pentaerythritol, sorbitan, bishydroxyethyl terephthalate, bisphenol A, polyethylene glycol and cyclohexane dimethanol.

As required, the polyoxalate may be blended with known additives such as plasticizer, heat stabilizer, photo stabilizer, antioxidant, ultraviolet ray absorber, flame retardant, coloring agent, pigment, filler, parting agent, antistatic agent, perfume, lubricant, foaming agent, antibacterial/antifungal agent, nucleating agent and the like.

The polyoxalate may be a copolymer that uses two or more kinds of polyhydric alcohols so far as its highly hydrolysable capability is not impaired, or may be the one that uses a carboxylic acid component other than the oxalic acid and lactone in small amounts as copolymerizable components.

As the carboxylic acid used as the copolymerizable component, there can be exemplified:

succinic acid;
adipic acid;
sebacic acid;
glutaric acid;
dicarboxylic acids such as decanedicarboxylic acid, cyclohexanedicarboxylic acid, terephthalic acid, isophthalic acid and anthracenedicarboxylic acid, and esters thereof; and
hydroxycarboxylic acids such as glycolic acid, L-lactic acid, D-lactic acid, hydroxypropionic acid, hydroxybutyric acid, hydroxyvaleric acid, hydroxycaproic acid, manderic acid, and hydroxybenzoic acid.

As the lactones, there can be exemplified glycolide, caprolactone, butylolactone, valerolactone, propiolactone and undecalactone.

The homopolymers or, copolymers of the above polyoxalate can also be used being mixed together, as a matter of course.

In the invention, the most desirable polyoxalate is a polyethylene oxalate formed from the oxalic acid and the ethylene glycol.

Further, the above-mentioned polyoxalate should have a suitable degree of molecular weight from the standpoint of its permeability into the ground and its function as a filler when it is used as the fracturing fluid. For instance, the polyethylene oxalate should, usually, have a weight average molecular weight in a range of 5,000 to 1,000,000 and, specifically, 10,000 to 500,000.

The polyoxalate is formed, by forming means known per se., into pellets, granular material, pulverized material as obtained by pulverizing the films, or into fibers or the like, and is dispersed as the hydrolysable resin material in water.

In the invention, further, in order to decrease the cost, the polyoxalate can be used as the hydrolysable resin material being blended with any other inexpensive hydrolysable resins in amounts in a range in which they do not hinder the above-mentioned excellent hydrolysable capability of the polyoxalate or, concretely, in such amounts that the hydrolysable capability of not less than 40% is maintained as measured by a method described later in Examples (e.g., in amounts of not more than 60 parts by weight per 100 parts by weight of the polyoxalate).

As such other hydrolysable resins, there can be exemplified polylactic acid, polyhydroxyalkanoate, polycaprolacone, polybutylene succinate, cellulose acetate and thermoplastic starch, which can be used in the form of copolymers or blends. From the standpoint of cost, however, the polylactic acid is most desired.

On condition that the above-mentioned hydrolysable capability is maintained, the polyoxalate may be, further, blended with a water-absorbing polymer such as polyvinyl alcohol or CMC to suppress the hydrolysis at room temperature and improve the stability thereof so that it can be handled more easily when used in the form of a fluid (fracturing fluid or filler) for the hydraulic fracturing method.

The hydrolysable resin material comprising the polyoxalate is, usually, made present in an aqueous dispersion solution in an amount of 0.01 to 20% by weight and, specifically, 0.01 to 10% by weight from the standpoint of smoothly executing the hydraulic fracturing and quickly forming the cracks based on the hydrolysable resin material.

<Other Additives>

In the invention, the aqueous dispersion solution in which the above hydrolysable resin material is dispersed can be blended with known additives that are used in the well drilling method or the hydraulic fracturing method.

In the case of the hydraulic fracturing method, for example, the aqueous dispersion solution can be blended with water-soluble polysaccharides (gelling agent) such as guar gum or chitosan as a viscosity-imparting agent or as a gelling agent, or can be blended with sand as a proppant (supporting agent) so that cracks formed by the hydraulic fracturing will not be clogged.

The aqueous dispersion solution can be, further, blended with a surfactant for dispersing the hydrolysable resin material and, further, with an acid, an alkali or an enzyme in a suitable amount to suitably accelerate the hydrolysis of the hydrolysable resin material.

The additives may be added in such amounts that permit the hydrolysable resin material to be dispersed in the above-mentioned amount in the aqueous dispersion solution without hindering properties such as hydrolysable capability of the hydrolysable resin material (polyoxalate).

<Drilling by Hydraulic Fracturing>

In the present invention, the dispersion solution for drilling in which the hydrolysable resin material is dispersed is introduced with pressure into the underground so that the hydrolysable resin in the dispersion solution is hydrolyzed at a temperature of not lower than 40° C. For example, by conducting the hydraulic fracturing by using the dispersion solution as the fracturing fluid, it is allowed to extract the desired underground resources.

Concretely speaking, a vertical shaft is formed by drilling down to the stratum where the desired underground resources may be present. Next, the drilling is conducted in a horizontal direction to form a horizontal hole to thereby form the well.

The thus formed well is filled with the dispersion solution for drilling containing the proppant described above, and is pressurized to execute the fracturing. Due to applying the pressure, the hydrolysable resin material and the proppant permeate into the vicinities of the horizontal hole and where the hydrolysable resin material undergoes the hydrolysis and extinguishes forming pillar structures. The remaining dispersion solution is sucked and, thereafter, the underground resources such as gases and oils are recovered.

When the hydraulic fracturing is conducted by using the dispersion solution for drilling of the invention as the fracturing fluid, the hydrolysable resin material quickly decomposes even at a temperature of about 60° C. or lower enabling the hydraulic fracturing to be efficiently conducted in short periods of time. Besides, by using the dispersion solution for drilling in a temperature range where the enzyme does not lose its activity, the hydrolysable resin material exhibits its biodegradable property to a sufficient degree. In addition to being used as the fracturing fluid, further, the hydrolysable resin material contained in the dispersion solution of the invention can also be used, for example, as a proppant (support material). The proppant can be formed from the hydrolysable resin material by suitably adjusting the molecular weight and the like of the hydrolysable resin material and forming it in sizes that can be used as the proppant. Then the proppant enters into the cracks formed in the vicinities of the well and works to maintain the cracks while the resources are being extracted. After the extraction, the proppant hydrolyses and can be easily recovered. The hydrolysable resin material can, further, be used as a plug, a filler or a break down material. When the well is drilled while refluxing the mud, the hydrolysable resin material can be used as the water loss-preventing agent in the finishing fluid eliminating the need of the subsequent step of treatment with acid. Besides, neither clogging nor trouble in the production occurs.

Even if the hydrolysable resin material permeates over unnecessarily wide areas and remains without being hydrolyzed, there is no probability of adversely affecting the environment.

EXAMPLES

The invention will now be described by way of the following Examples.

In the Experiments, measurements were taken by the methods described below.

<Measuring the Melting Points and Glass Transition Temperatures>

Apparatus: DSC 6220 (differential scanning calorimeter) manufactured by Seiko Instruments Co.
Preparation of samples: Amount of samples, 5 to 10 mg.
Measuring conditions: Nitrogen atmosphere, elevating the temperature at a rate of 10° C./min. over a range of 0° C. to 250° C.

<Measuring the Molecular Weights>

Apparatus: Gel permeation chromatograph GPC
Detector: Differential refractive index detector RI (Model RI-2414 manufactured by Waters Co., sensitivity: 512)
Column: Shodex HFIP-LG (one unit), HFIP-806M (2 units), manufactured by Showa Denko Co.
Solvent: Hexafluoroisopropanol (5 mM sodium trifluoroacetate is added)
Flow rate: 0.5 mL/min.
Column temperature: 40° C.
Preparation of samples: 5 milliliters of a solvent was added to about 1.5 mg of a sample and the mixture thereof was mildly stirred at room temperature (sample concentration of about 0.03%). After having confirmed with the naked eye that the sample had been dissolved, the solvent was filtered using a 0.45 μm filter (repeated twice from the weighing). All samples were measured in about one hour from the start of preparation.

Synthesis of the polyethylene oxalate (hereinafter abbreviated as "PEOx").

Into a 1 L separable flask equipped with a mantle heater, a stirrer, a nitrogen introduction tube and a cooling tube, there were introduced:
dimethyl oxalate, 472 g (4 mols),
ethylene glycol, 297 g (4.8 mols), and
tetrabutyl titanate, 0.42 g, and the temperature in the flask was elevated in a nitrogen stream from 120° C. up to 180° C. while distilling the methanol off to conduct the reaction for 7 hours. Finally, 270 ml of methanol was distilled off.

Thereafter, the temperature therein was elevated stepwise to 170° C. to 190° C. to conduct the reaction for 7 hours under a reduced pressure of 0.1 to 0.2 kPa. Since the viscosity has increased, the reaction product was taken out.

The polymer that was taken out was granulated by using a crusher, and was dried in vacuum at 110° C. for 4 hours so as to be crystallized to thereby obtain PEOx pellets.

The obtained polymer possessed a weight average molecular weight of 70,000, a melting point of 180° C. and a glass transition temperature of 35° C.

<Preparation of Polylactic Acid (PLA) Pellets>

For the purpose of comparison, the polylactic acid (PLA) was fed to a biaxial extruder (ULT Nano 05-20AG manufactured by Technovel Co.) and was melted at 205° C. to prepare pellets thereof so as to be used as a sample hydrolysable resin material. The polylactic acid was 4032D manufactured by Natureworks Co.

<Hydrolyzing Test>

A piece of pellet prepared above was added to 10 ml of a dispersant in a 25-ml vial which was then stored still at each of the temperatures. After stored for 4 days, the pellet was taken out, dried in a vacuum drier heated at 60° C. for 4 hours, measured for its weight and was measured for its ratio of decomposition. The ratio of decomposition was calculated according to the following formula, Ratio of decomposition=(initial weight−weight after decomposed)/initial weight×100

The samples having ratios of decomposition of not more than 40% were judged to be × whereas the samples having ratios of decomposition exceeding 40% were judged to be ◯.

As the dispersants, there were used distilled water and guar gum aqueous solution (aqueous solution containing 0.7 wt % of guar gum) to evaluate the hydrolyzing capabilities.

Examples 1 to 6, Comparative Examples 1 to 5

As pellets of the hydrolysable resin material, there were used the PEOx pellets prepared above. Namely, the PEOx pellets were dispersed in dispersion media of temperatures (decomposition temperatures) shown in Table 1, and the above hydrolysis test was conducted to measure their ratios of decomposition (Experiments 1 to 6). The results were as shown in Table 1.

Instead of using the PEOx pellets, further, the PLA pellets prepared above were dispersed in dispersion media of temperatures shown in Table 1 like in the above Experiments. The results were as shown in Table 1.

TABLE 1

|  | Pellets | Dispersion medium | Decomposition temperature (° C.) | Ratio of decomposition |
|---|---|---|---|---|
| Experiment 1 | PEOx | distilled water | 45 | ◯ |
| Experiment 2 | PEOx | distilled water | 55 | ◯ |
| Experiment 3 | PEOx | distilled water | 70 | ◯ |
| Experiment 4 | PEOx | distilled water | 80 | ◯ |
| Experiment 5 | PEOx | guar gum al. sol. | 55 | ◯ |
| Experiment 6 | PEOx | quar gum aq. sol. | 70 | ◯ |
| Comp. Ex. 1 | PLA | Distilled water | 55 | X |
| Comp. Ex. 2 | PLA | Distilled water | 70 | X |
| Comp. Ex. 3 | PLA | distilled water | 80 | X |

TABLE 1-continued

|  | Pellets | Dispersion medium | Decomposition temperature (° C.) | Ratio of decomposition |
|---|---|---|---|---|
| Comp. Ex. 4 | PLA | guar gum aq. sol. | 55 | X |
| Comp. Ex. 5 | PLA | guar gum aq. sol. | 70 | X |

<Experiment 7>

As the hydrolysable resin materials, there were used crystallized powders obtained by freeze-pulverizing the PEOx pellets and the PLA pellets prepared above.

18 Milligrams of the above PEOx crystallized powder or the PLA crystallized powder and 10 ml of distilled water were put into the 25-ml vial. The vial was then put into an oven maintained at 50° C. or 70° C. and was stored still. After stored for 3 days, the solution was filtered to recover the powder. After drying, the powder was measured for its weight to calculate the ratio of decomposition. The results were as shown in Table 2 below.

TABLE 2

|  | Ratio of decomposition (%) | |
|---|---|---|
|  | 0 day | After 3 days |
| 50° C. | | |
| PEOx | 0 | 85 |
| PLA | 0 | 0 |
| 70° C. | | |
| PEOx | 0 | 100 |
| PLA | 0 | 0 |

In the case of the PLA, a reduction in the weight due to the hydrolysis could not be confirmed at either 50° C. or 70° C. The PEOx, on the other hand, had been hydrolyzed. At 70° C., specifically, the PEOx had been completely decomposed.

It will, therefore, be learned that the PEOx contained in the dispersion solution for drilling of the present invention effectively works as a filler, undergoes the hydrolysis with the passage of time after having been filled in the well and easily collapses therein due to the pressure in the well. Besides, the PEOx can be used as a support for holding cracks formed in the vicinities of the well. After having extracted the resources, the PEOx quickly undergoes the hydrolysis and can be easily recovered together with water in the well.

Example 8

Gelation Test Using an Acid-Containing Aqueous Solution:

There were prepared aqueous solutions each containing 5% of oxalic acid (Ox), glycolic acid (Gly) or lactic acid (LA).

5 Milliliters of the above acid-containing aqueous solution and 0.2 g of chitosan (gelling agent) were put into the 25-ml vial which was stored still in an oven heated at 70° C. The fluidity was judged after one hour, 12 hours and 24 hours have passed.

The liquids that were gelled and lost fluidity were evaluated to be ◯, the liquids that exhibited fluidity but possessed viscosity larger than that water were evaluated to be Δ, and the liquids having viscosity equivalent to water were evaluated to be x. The results were as shown in Table 3.

TABLE 3

|  | After 1 hour | After 12 hours | After 24 hours |
|---|---|---|---|
| 5% Ox aq. sol. | ◯ | Δ | X |
| 5% Gly aq. sol. | ◯ | ◯ | ◯ |
| 5% LA aq. sol. | ◯ | ◯ | ◯ |

From the above results, the aqueous solutions of glycolic acid and lactic acid were both gelled and lost fluidity irrespective of the time.

On the other hand, the aqueous solution of oxalic acid was once gelled at 70° C. and lost fluidity but, after 24 hours have passed, has resumed fluidity showing a specific change in the properties. It was, therefore, learned that if there is used, as a fracturing fluid, a dispersion solution containing a gelling agent and a hydrolysable resin that releases oxalic acid upon the hydrolysis, then cracks can be formed due to the fracturing in the stage where the solution undergoes the gelling. Thereafter, the dispersion solution resumes the fluidity with the passage of time; i.e., the fracturing fluid can be recovered without using a gel breaker.

Gelling Test Using a Polymer:

By taking the above experimental results into consideration, a gelling test was conducted using a polymer.

That is, 1 g of the crystallized PEOx pellet or the PLA pellet prepared above was put into the 25-ml vial together with 5 ml of water and 0.2 g of chitosan. The vial was then stored still in an oven maintained at 70° C., and the fluidity was judged after the passage of one hour, 6 hours and 12 hours in the same manner as described above. The results were as show in Table 4.

TABLE 4

|  | After 1 hour | After 6 hours | After 12 hours |
|---|---|---|---|
| PLA | X | X | X |
| PEOx | X | ◯ | Δ |

From the above results, the PLA is not hydrolyzed at 70° C., no lactic acid is released therefrom, the pH of the solution does not decrease and, as a result, chitosan that is a gelling agent does not dissolve, and the liquid is not gelled.

The PEOx, on the other hand, hydrolyses at 70° C., releases the oxalic acid and, therefore, behaves like an oxalic acid-containing aqueous solution. It will, therefore, be understood that the dispersion solution for drilling of the present invention that contains the PEOx, can be gelled in a low-temperature range and can be used as a fracturing fluid that necessitates no gel breaker.

What is claimed is:

1. A method of extracting underground natural resources through an ore chute located in a temperature region where temperature in the region is not higher than 60° C.,
   the method comprising introducing a dispersion solution into the ore chute with pressure,
   wherein the dispersion solution is obtained by dispersing, in water, a hydrolyzable resin pellet that contains a polyoxalate having a ratio of decomposition higher than 40% when the pellet is stored for 4 days at 45° C. in distilled water, in order to hydrolyze the hydrolyzable resin pellet to extract underground natural resources.

2. The method according to claim 1, wherein
the hydrolyzable resin pellet contains a hydrolyzable resin other than the polyoxalate in amount of not more than 60 parts by weight per 100 parts by weight of the polyoxalate.

3. The method according to claim 2, wherein the hydrolyzable resin other than the polyoxalate is a polylactic acid, a polyhydroxyalkanoate, a polycaprolacone, a polybutylene succinate, a cellulose acetate or a thermoplastic starch.

* * * * *